United States Patent [19]
Kaufmann

[11] Patent Number: 5,596,490
[45] Date of Patent: Jan. 21, 1997

[54] CONVERTER CIRCUIT FOR GENERATING DIRECT CURRENT WITH SELECTABLE POLARITY

[75] Inventor: Heiko Kaufmann, Schongau, Germany

[73] Assignee: Antelec Engineering GmbH, Schongan, Germany

[21] Appl. No.: 489,074

[22] Filed: Jun. 6, 1995

[30] Foreign Application Priority Data

Sep. 12, 1992 [DE] Germany .............. 42 41 486.5

[51] Int. Cl.⁶ .................................................. H02M 7/02
[52] U.S. Cl. .................................................. 363/63
[58] Field of Search ............................ 363/17, 63, 98, 363/132

[56] References Cited

U.S. PATENT DOCUMENTS

| | | | |
|---|---|---|---|
| 4,671,390 | 6/1987 | Stanyard et al. | 187/120 |
| 4,737,897 | 4/1988 | Shipley et al. | 363/19 |
| 4,740,878 | 4/1988 | Carter et al. | 363/63 |
| 4,835,652 | 5/1989 | Billings et al. | 361/79 |
| 5,317,254 | 5/1994 | Olson | 363/63 |

FOREIGN PATENT DOCUMENTS

| | | |
|---|---|---|
| 2612231 | 10/1987 | Germany . |
| 58-157389 | 9/1983 | Japan . |
| 94/14232 | 6/1994 | WIPO . |

OTHER PUBLICATIONS

W. Chater, "MOSFETs provide low–loss rectification", EDN–Electrical Design News, Feb. 18, 1988, No. 4. pp. 237,239.

*Primary Examiner*—Matthew V. Nguyen
*Attorney, Agent, or Firm*—Helfgott & Karas, P.C.

[57] ABSTRACT

A two- or three-phase input transformer (1) feeds a conventional six-diode full-wave bridge rectifier (3) whose output terminals (4, 5) are connected through capacitors (6, 7) to the star point (2) of the second side (1b) of the transformer, and through controlled switches (9, 10) to a midpoint (8). A DC motor (11) connected between the star point and midpoint is coupled to a tachogenerator (12) which supplies a signal to the control circuit (13) operating the controlled switches, which preferably are modified MOSFETs with temperature-compensated reference voltage.

9 Claims, 2 Drawing Sheets

CONVERTER CIRCUIT FOR GENERATING DIRECT CURRENT WITH SELECTABLE POLARITY

RELATED PATENT APPLICATION

This is a continuation of application Ser. No. PCT/EP93/03384 filed Dec. 2, 1993.

FIELD OF THE INVENTION

The present invention relates to a converter circuit for producing direct current with selectable polarity from a three-phase alternating voltage, with the following characteristics:

On the input side there is a rectifier circuit arrangement with a bridge rectifier.

The output of the rectifier circuit arrangement is brought together, via two semiconductor switching elements, to one center point;

the output side of the converter circuit takes the form of an artificial star point on the one hand and a center point on the other hand.

BACKGROUND OF THE INVENTION

The invention furthermore relates to a converter circuit, specified in the generic part of claim 2, to produce direct current with selectable polarity from a two-phase alternating voltage.

In the prior art, converters are known, which are designed as "rotary converters", in the form of a motor-generator set. In these known converters, the motor is thus driven by the three-phase current, and the direct current with the desired polarity and voltage is tapped from the generator, which is controlled by a control unit.

The commutators, which are present on the direct current side of these converters, are subject to wear. Increasing wear, on the other hand, favors the creation of sparks. For this reason, in installations which are sensitive to sparks, the converter must be maintained at regular intervals. In this way, maintenance intervals of about 40 days are necessary for converters, which run around the clock. This is associated with high costs.

A converter circuit of the generic type, in which the conversion is exclusively effected electronically and not by rotating pans, is known from the IP-58157389 (Patent Abstracts of Japan, Volume 7, No. 280, E-216). This converter circuit has no rotating parts and consequently is absolutely free of wear, and thus needs little maintenance. The known converter circuit of this kind consequently greatly surpasses "rotary converters" with regard to reliability, and consequently is especially suitable for applications, for which a continuous operation with a high reliability is important. However, it has the disadvantage that the production of a continuously variable direct voltage presents difficulties.

SUMMARY OF THE INVENTION

It is an object of the present invention to provide a converter circuit of the type mentioned in the introduction, which will make it possible to produce a continuously variable direct voltage with minimal structural complications and without cycles that interfere with the peripheral equipment.

Pursuant to the present invention, this objective is accomplished by the converter circuits specified in claims 1 and 2. Thus, the series regulator consists of modified driven MOSFET transistors. The positive potential of the direct voltage furnished by the rectifier circuit arrangement is present at the drain of one MOSFET transistor and the negative potential is present at the source of the other MOSFET transistor. The source of the first MOSFET transistor and the drain of the other MOSFET transistor, on the other hand, are connected to the center point. By means of the inventive circuit, a linear operation of the MOSFET transistors is achieved, so that cycling, which interferes with the peripheral equipment is eliminated. Consequently, the invention is applicable especially where a high degree of radio interference suppression is important. In addition, the invention allows the use of the converter circuit at the very highest powers without generating impermissibly excessive heat in the series regulators. Indeed, the series regulator derived in this fashion operates in the switched-through state practically without loss. By contrast, an series regulator according to the bipolar technique and comprising 20 to 30 individual transistors would have more than ten times these losses.

The basic advantages of an series regulator using a MOSFET transistor make such a device also interesting for other applications (other than the inventive converter circuit).

In a suitable application of the inventive converter circuit, the series regulator can be controlled, by means of a control unit, as a function of a tacho signal from a tacho, which is coupled to a direct current motor that is connected to the output side of the converter circuit. This results, for example, in a positioning drive with excellent output data.

The star point/center point on the secondary side of the transformer advisably is connected to the output terminals of the bridge rectifier circuit, the connection consisting of a capacitor for each terminal. By these means, the circuit is supported effectively at high starting currents.

In practical application, cases sometimes occur, which require two DC power supplies. The two DC power supplies, which can be furnished by the invention, basically have opposite polarities and a common center point. The center point is equivalent to the star point of the secondary transformer winding. By these means, the two DC power supplies can be furnished with only one transformer and one bridge rectifier circuit.

BRIEF DESCRIPTION OF THE DRAWINGS

The invention is explained in greater detail below by means of a preferred embodiment.

DETAILED DESCRIPTION OF THE INVENTION

Figure 1:
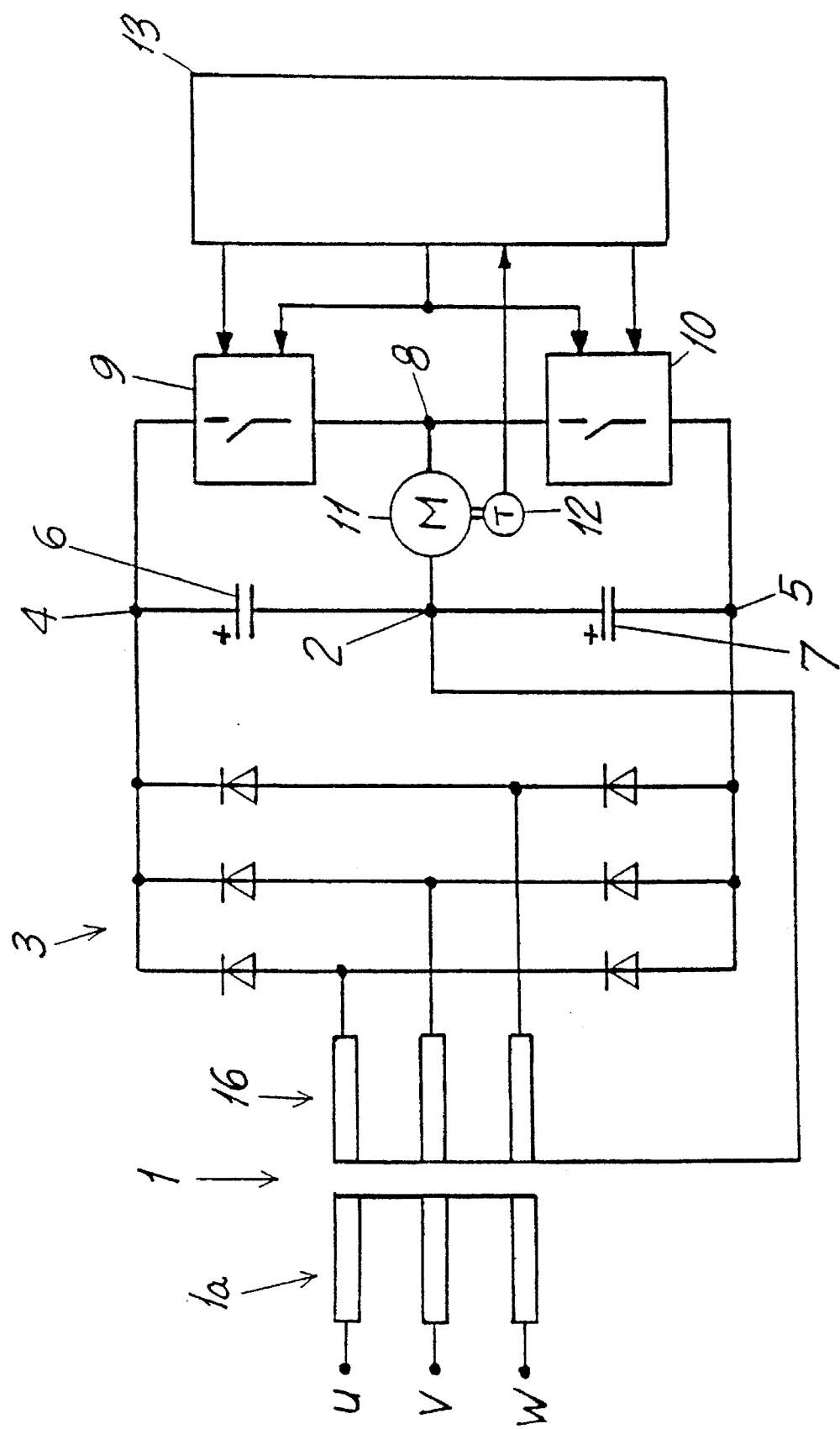
FIG. 1 shows a circuit for a static converter with three-phase alternating current, as well as a motor and a control unit.

The primary side 1a of the transformer 1 has terminals for the three phases U, V, W of the input three-phase alternating current. The secondary side 1b of the transformer 1 is wired in a star circuit. As for the rest, it is connected in a known manner with a bridge rectifier circuit 3, so that the converter circuit has a classical six-coil bridge circuit on its input side.

The two output terminals 4, 5 of the bridge rectifier circuit 3 are brought together to a center point 8 via two series regulators 9, 10. The center point 8, together with the artificial star point 2, comprises the output of the converter circuit. By suitably influencing the two series regulators, a direct current of predetermined polarity and voltage can be tapped between the star point 2 and the center point 8.

Furthermore, each output terminal 4, 5 of the bridge rectifier circuit 3 is connected, via a capacitor 5, 6, to the star point 2 of the secondary side 1b of the transformer 1.

Figure 2:
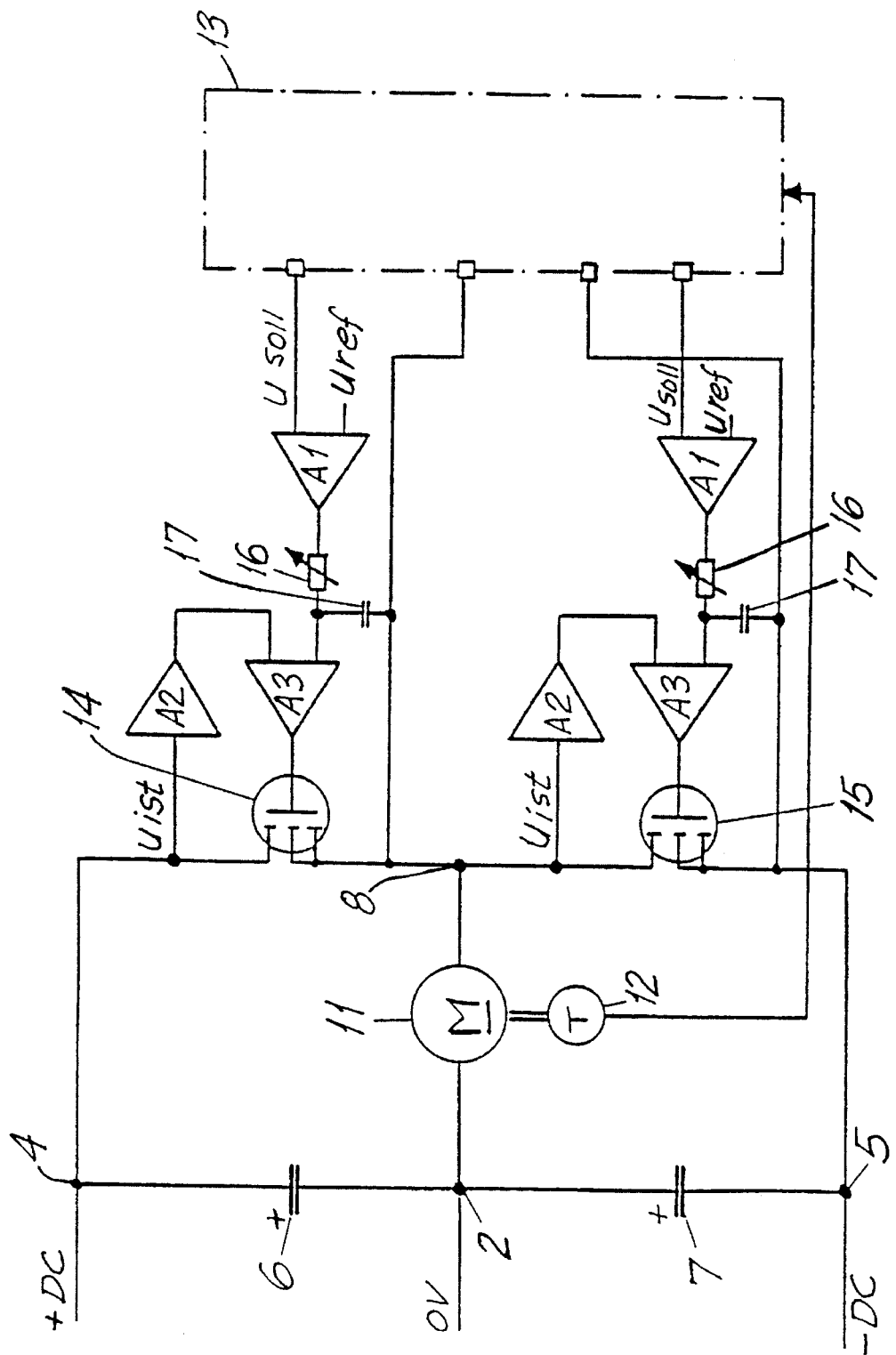
FIG. 2 shows a preferred design of the regulator section of the converter circuit used in accordance with FIG. 1.

In the positioning drive shown in FIGS. 1 and 2, a DC motor 11 is connected to the output terminals 2, 8 of the converter circuit. A tacho 12 is coupled to this motor. The tacho 12 generates a tacho signal, which the control circuit 13 uses to control the two series regulators 9, 10.

FIG. 2 elucidates the design of the series regulators 9 and 10 of FIG. 1, as modified, driven MOSFET transistors. The circuit specified in FIG. 2 achieves linear operation of the MOSFET transistors, thus eliminating cycles, which interfere with the peripheral equipment. The positive potential of the direct voltage furnished by the rectifier circuit arrangement is present at the drain of the MOSFET transistor 14 and a negative potential is present at the source of the MOSFET transistor 15. On the other hand, the source of the MOSFET transistor 14 and the drain of the MOSFET transistor 15 are connected to the center point 8. In each case, a comparator A3 acts on the gate of the two MOSFET transistors 14, 15.

In the comparator A3, the actual voltage measured by the measurement sensor A2 is compared with the nominal voltage, which is determined by the control unit 13 as a function of the tacho signal from the tacho 12.

In the comparator A1 the nominal voltage is compared with a temperature-compensated reference voltage, so as to exclude a temperature response.

The RC elements shown in FIG. 2 each comprise a resistor 16 and a capacitor 17. Their purpose is to adjust the regulation time constant of the inventive, stationary converter to that of a known rotary converter operating according to the motor-generator principle (up to 300 msec for 0 to 100% load). In this way, the inventive converter circuit can replace known converters in existing installations without affecting the regulation behavior. On the other hand, if rapid regulation is desired, the two RC elements naturally can be omitted, by shunting the resistors 16 and removing the capacitors 17.

What is claimed is:

1. A converter circuit for producing direct current with selectable polarity from a three-phase alternating voltage, with the following characteristics:

on the input side, there is a rectifier circuit arrangement with a bridge rectifier(3);

the output (4, 5) of the rectifier circuit arrangement is brought together, via two semiconductor switching elements, to one center point (8);

the output side of the converter circuit takes the form of an artificial star point (2) on the one hand and the center point (8) on the other hand, and characterized by the following features:
the rectifier circuit arrangement is connected to the secondary side (1b) of a transformer (1), which is formed as a star circuit and defines the artificial star point (2);
the converter circuit is suitable for producing a direct current with a continuously variable voltage, by using switching elements consisting of series regulators (9, 10) operating in linear operation;
the series regulators (9, 10) are designed as modified driven MOSFET transistors (14, 15), the positive potential of the direct voltage furnished by the rectifier circuit arrangement being present at the drain of the first MOSFET transistor (14) and the negative potential being present at the source of the second MOSFET transistor (15) and, furthermore, the source of the first MOSFET transistor (14) and the drain of the second MOSFET transistor (15) being connected to the center point (8).

2. A converter circuit for producing direct current with selectable polarity from a two-phase alternating voltage, with the following characteristics:

on the input side, there is a rectifier circuit arrangement with a bridge rectifier, the output of the rectifier circuit arrangement is brought together, via two semiconductor switching elements, to a first center point;

the output side of the converter circuit takes the form of an artificial second center point on the one hand and the first center point on the other, characterized by the following features:
the rectifier circuit arrangement is connected to the secondary side of a transformer, which is formed as a center point circuit and defines the artificial second center point;
the converter circuit arrangement is suitable for producing a direct current with a continuously variable voltage, in that series regulators operating in linear operation are used as switching elements;
the series regulators are designed as modified, driven MOSFET transistors, the positive potential of the direct voltage furnished by the rectifier circuit arrangement being present at the drain of the first MOSFET transistor and the negative potential being present at the source of the second MOSFET transistor and, furthermore, the source of the first MOSFET transistor and the drain of the second MOSFET transistor being connected to the center point.

3. The converter circuit of claim 1, wherein the artificial star point/center point (2) of the secondary side (1b) of the transformer (1) is connected to the output terminals (4,5) of the bridge rectifier circuit (3) via a capacitor (6,7).

4. The converter circuit of claim 1, wherein the gate of the two MOSFET transistor (14, 15) is always driven by a comparator (A3), one input of which is acted upon by the fed-back drain voltage of the associated MOSFET transistor.

5. The converter circuit of claim 1, wherein the secondary side (1b) of the transformer (1) as well as the elements, which are connected in series, are duplicated so as to generate two direct currents of selectable polarity and voltage.

6. The converter circuit of one of the claims 1, characterized by an electric motor (11), which is connected to the output side, a tacho (12), which is coupled to said electric motor and a control unit (13), which controls the series regulators (9 10) as a function of a tacho signal furnished by the tacho (12).

7. The converter circuit of claim 2, wherein the artificial center point (2) of the secondary side (1b) of the transformer (1) is connected to the output terminals (4,5) of the bridge rectifier circuit (3) via a capacitor (6, 7).

8. The converter circuit of claim 2, wherein the gate of the two MOSFET transistors (14, 15) is always driven by a comparator (A3), one input of which is acted upon by the fed-back drain voltage of the associated MOSFET transistor.

9. The converter circuit of one of the claims 2, characterized by an electric motor (11), which is connected to the output side, a tacho (12), which is coupled to said electric motor and a control unit (13), which controls the series regulators (9 or 10) as a function of a tacho signal furnished by the tacho (12).

* * * * *

UNITED STATES PATENT AND TRADEMARK OFFICE
CERTIFICATE OF CORRECTION

PATENT NO. : 5,596,490

DATED : 1-21-97

INVENTOR(S) : Heiko KAUFMANN

It is certified that error appears in the above-identified patent and that said Letters Patent is hereby corrected as shown below:

On The Title Page, item (22), delete "Jun. 6, 1995" and Insert --Jun. 9, 1995--.

item (30) delete "Sep. 12, 1992" and insert --Dec. 9, 1992--.

Add item (63) --Continuation of PCT/EP93/03384, Dec. 2, 1993--.

Signed and Sealed this

Seventeenth Day of June, 1997

*Attest:*

BRUCE LEHMAN

*Attesting Officer*  *Commissioner of Patents and Trademarks*